(12) United States Patent
Mantri et al.

(10) Patent No.: US 9,476,154 B2
(45) Date of Patent: Oct. 25, 2016

(54) WASHING MACHINE APPLIANCE AND DAMPER ASSEMBLY FOR SAME

(71) Applicant: General Electric Company, Schenectady, NY (US)

(72) Inventors: Parag Mantri, Bangalore (IN); Savio Sebastian Kathayanatt, Bangalore (IN); Christopher Nils Naber, Louisville, KY (US); Sanjay Manohar Anikhindi, Bangalore (IN); Paul Owen Davis, Prospect, KY (US); Anoop Singh, Bangalore (IN)

(73) Assignee: Haier U.S. Appliance Solutions, Inc., Wilmington, DE (US)

( * ) Notice: Subject to any disclaimer, the term of this patent is extended or adjusted under 35 U.S.C. 154(b) by 126 days.

(21) Appl. No.: 14/494,630

(22) Filed: Sep. 24, 2014

(65) Prior Publication Data

US 2016/0083889 A1 Mar. 24, 2016

(51) Int. Cl.
| | | |
|---|---|---|
| *D06F 37/24* | (2006.01) | |
| *F16F 7/08* | (2006.01) | |
| *F16F 7/09* | (2006.01) | |
| *D06F 37/20* | (2006.01) | |

(52) U.S. Cl.
CPC ............ *D06F 37/245* (2013.01); *D06F 37/24* (2013.01); *F16F 7/087* (2013.01); *F16F 7/095* (2013.01); *D06F 37/20* (2013.01)

(58) Field of Classification Search
CPC ........ D06F 37/20; D06F 37/22; D06F 37/24; F16F 7/087; F16F 7/095
See application file for complete search history.

(56) References Cited

U.S. PATENT DOCUMENTS

| | | | |
|---|---|---|---|
| 6,367,601 B1* | 4/2002 | Ferlicca | F16F 7/09 188/381 |
| 7,204,104 B2 | 4/2007 | Kim et al. | |
| 7,472,567 B2* | 1/2009 | Park | D06F 37/22 188/381 |
| 7,861,833 B2 | 1/2011 | Park et al. | |
| 7,971,693 B2* | 7/2011 | Peuker | D06F 37/20 188/381 |
| 2004/0144137 A1 | 7/2004 | Park et al. | |
| 2004/0261469 A1* | 12/2004 | Park | D06F 37/22 68/23 R |
| 2011/0259688 A1* | 10/2011 | Kanioz | D06F 37/20 188/381 |
| 2014/0090939 A1* | 4/2014 | Kanioz | F16F 7/09 188/271 |
| 2015/0020551 A1* | 1/2015 | Yu | D06F 37/265 68/23.3 |

FOREIGN PATENT DOCUMENTS

TR WO 2013010921 A2 * 1/2013 ............. D06F 37/20

* cited by examiner

*Primary Examiner* — Joseph L Perrin
(74) *Attorney, Agent, or Firm* — Dority & Manning, P.A.

(57) ABSTRACT

Washing machine appliances and damper assemblies are provided. A damper assembly includes a cylinder defining a central longitudinal axis, the cylinder including a sidewall that defines an interior, the sidewall defining a central bore and a pocket concentrically surrounding the central bore, the sidewall including an upper shoulder and a lower shoulder that each connect the pocket and the central bore. The damper assembly further includes a piston partially disposed in the central bore and movable along the longitudinal axis relative to the cylinder. The damper assembly further includes a tube assembly concentrically surrounding the piston and at least partially disposed in the pocket, the tube assembly having a length that is less than a length of the pocket. The piston is further movable along the longitudinal axis relative to the tube assembly.

18 Claims, 5 Drawing Sheets

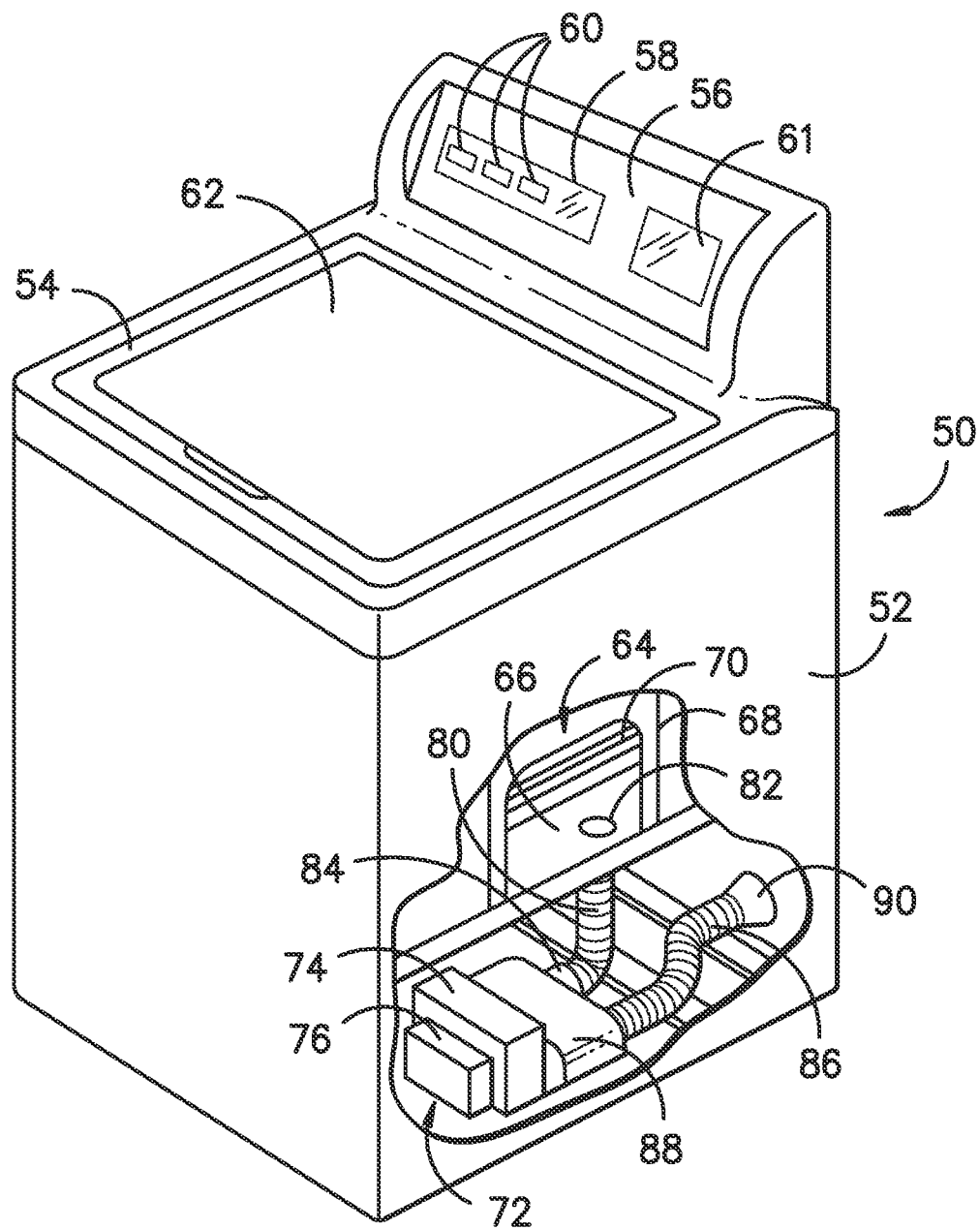
FIG. -1-

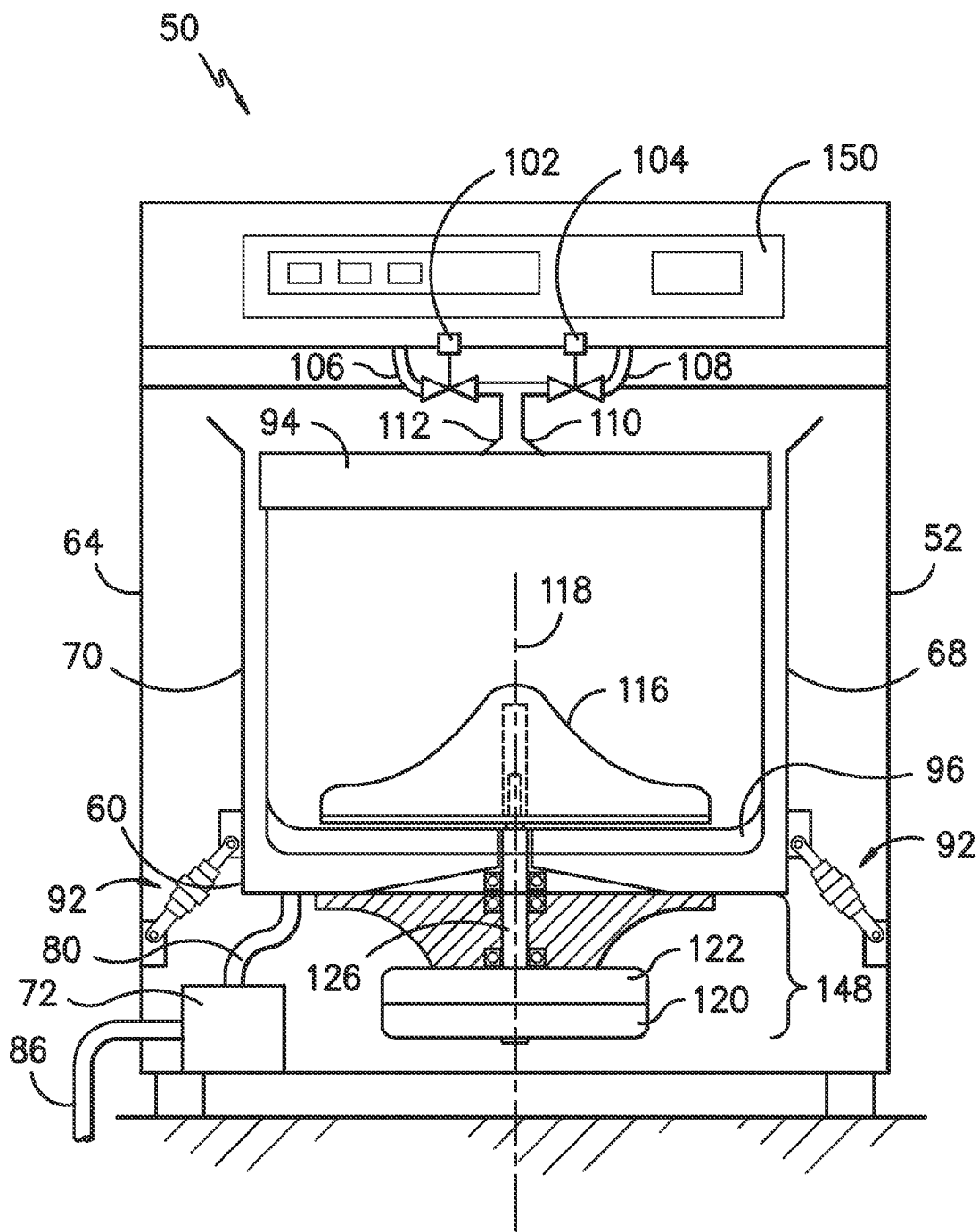
FIG. -2-

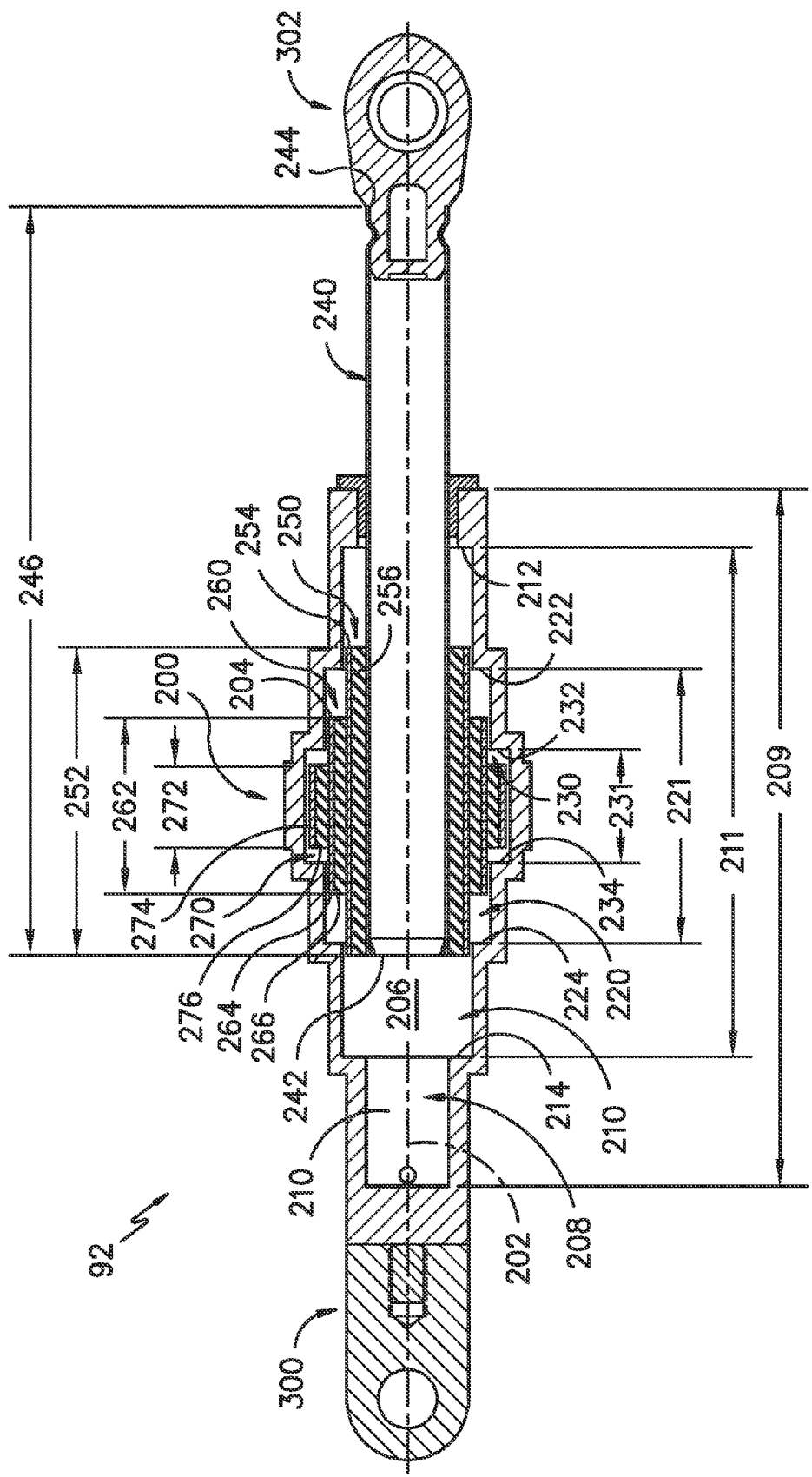
FIG. -3-

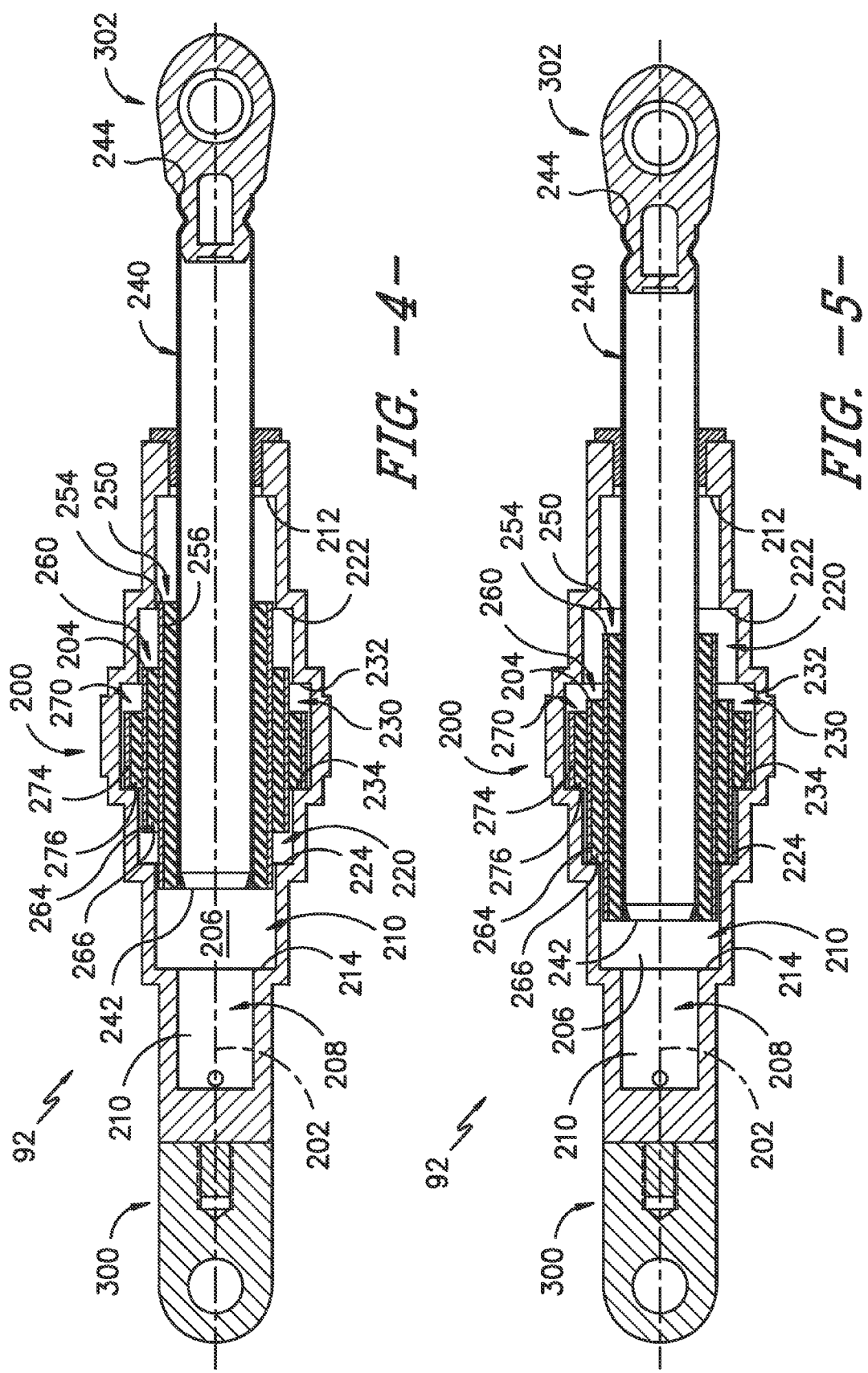

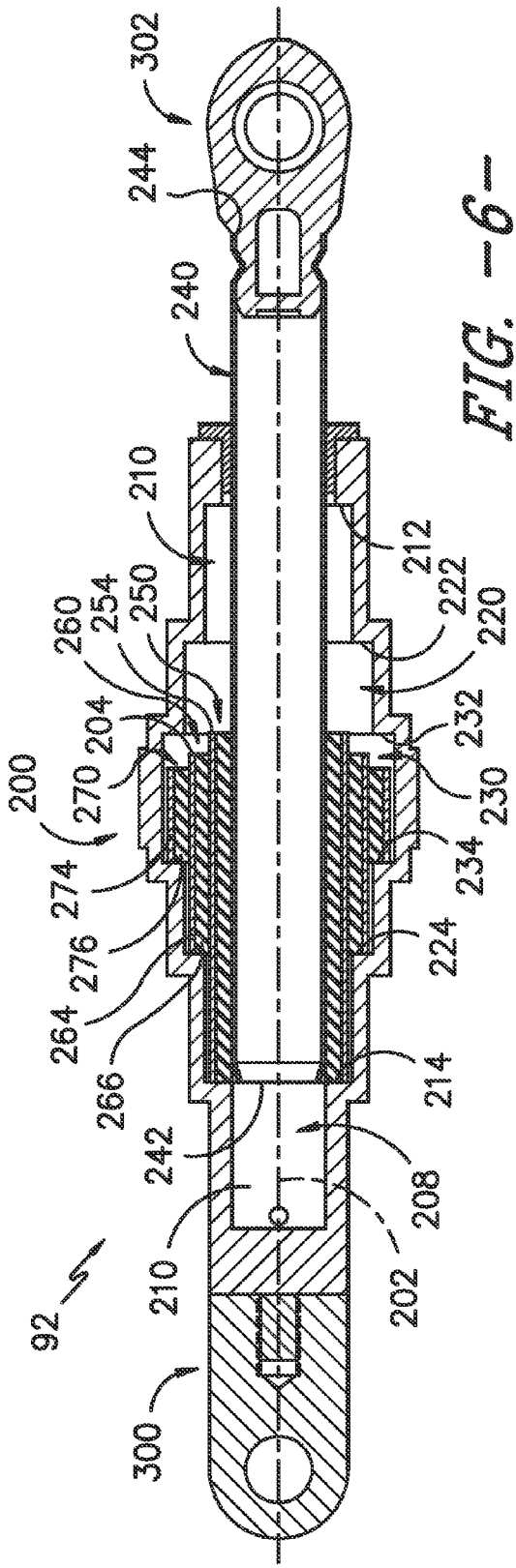
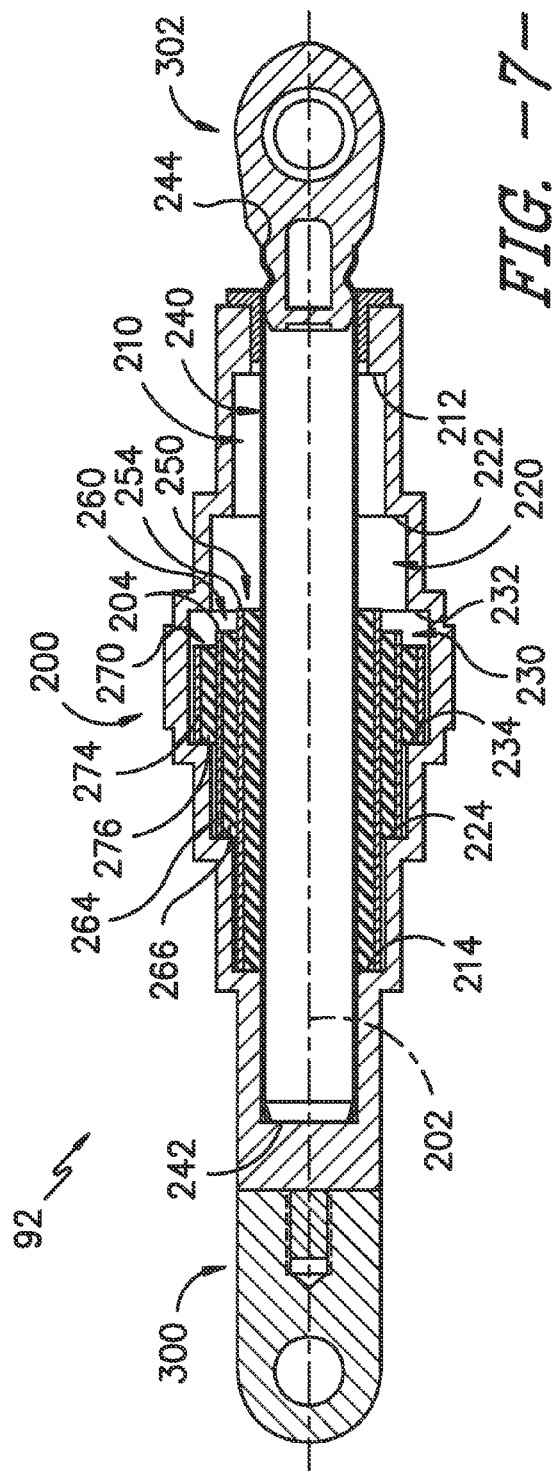

WASHING MACHINE APPLIANCE AND DAMPER ASSEMBLY FOR SAME

FIELD OF THE INVENTION

The present subject matter relates generally to washing machine appliances, such as vertical axis washing machine appliances, and damper assemblies for washing machine appliances.

BACKGROUND OF THE INVENTION

Washing machine appliances generally include a cabinet which receives a tub for containing wash and rinse water. A wash basket is rotatably mounted within the wash tub. A drive assembly is coupled to the wash tub and configured to rotate the wash basket within the wash tub in order to cleanse articles within the wash basket. Upon completion of a wash cycle, a pump assembly can be used to rinse and drain soiled water to a draining system.

Washing machine appliances include vertical axis washing machine appliances and horizontal axis washing machine appliances, where "vertical axis" and "horizontal axis" refer to the axis of rotation of the wash basket within the wash tub. Vertical axis washing machine appliances typically have the wash tub suspended in the cabinet with damping devices. Vertical axis washing machine appliances exhibit vibration harmonics and work in a wide range of rotational speeds.

Many previously known damping devices are fixed friction damping devices which are tuned to one condition that requires the greatest amount of friction. Such fixed friction type damping devices, however, may poorly accommodate the wide range of mass, imbalance, and rotational speed seen in vertical axis washing machine appliances. More recently, various two-stage damping devices have been utilized. These devices provide minimal or no damping under certain conditions and substantial damping under other conditions. Such devices do not adequately address the wide range of mass, imbalance, and rotational speed seen in vertical axis washing machine appliances. Still further, the use of active dampers has been contemplated. However, such dampers are generally considered cost-prohibitive for washing machine appliance applications.

Accordingly, a need exists for improved damping devices for use in washing machine appliances. In particular, damping device which includes variable damping features for varying the damping force generated by the damping device would be advantageous.

BRIEF DESCRIPTION OF THE INVENTION

In accordance with one embodiment, a damper assembly is provided. The damper assembly includes a cylinder defining a central longitudinal axis, the cylinder including a sidewall that defines an interior, the sidewall defining a central bore and a pocket concentrically surrounding the central bore, the sidewall including an upper shoulder and a lower shoulder that each connect the pocket and the central bore. The damper assembly further includes a piston partially disposed in the central bore and movable along the longitudinal axis relative to the cylinder. The damper assembly further includes a tube assembly concentrically surrounding the piston and at least partially disposed in the pocket, the tube assembly having a length that is less than a length of the pocket. The piston is further movable along the longitudinal axis relative to the tube assembly.

In accordance with another embodiment, a washing machine appliance is provided. The washing machine appliance includes a cabinet, a tub disposed within the cabinet, and a damper assembly. The damper assembly includes a cylinder defining a central longitudinal axis, the cylinder including a sidewall that defines an interior, the sidewall defining a central bore and a pocket concentrically surrounding the central bore, the sidewall including an upper shoulder and a lower shoulder that each connect the pocket and the central bore. The damper assembly further includes a piston partially disposed in the central bore and movable along the longitudinal axis relative to the cylinder. The damper assembly further includes a tube assembly concentrically surrounding the piston and at least partially disposed in the pocket, the tube assembly having a length that is less than a length of the pocket. The piston is further movable along the longitudinal axis relative to the tube assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a perspective view of a washing machine appliance, with a portion of a cabinet of the washing machine appliance shown broken away in order to reveal certain interior components of the washing machine appliance, in accordance with one embodiment of the present disclosure;

FIG. 2 provides a front elevation schematic view of various components of the washing machine appliance of FIG. 1.

FIG. 3 is a cross-sectional view of a damper assembly in accordance with one embodiment of the present disclosure;

FIG. 4 is a cross-sectional view of the damper assembly of FIG. 3, illustrating movement of a third tube assembly along a longitudinal axis, providing a minimal frictional force;

FIG. 5 is a cross-sectional view of the damper assembly of FIG. 3, illustrating movement of a second tube assembly relative to the third tube assembly along a longitudinal axis, providing a low intermediate frictional force;

FIG. 6 is a cross-sectional view of the damper assembly of FIG. 3, illustrating movement of a first tube assembly relative to the second tube assembly along a longitudinal axis, providing a high intermediate frictional force; and FIG. 7 is a cross-sectional view of the damper assembly of FIG. 3, illustrating movement of a piston relative to the first tube assembly along a longitudinal axis, providing a maximum frictional force.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view partially broken away of a washing machine appliance 50 according to an exemplary embodiment of the present subject matter. As may be seen in FIG. 1, washing machine appliance 50 includes a cabinet 52 and a cover 54. A backsplash 56 extends from cover 54, and a control panel 58 including a plurality of input selectors 60 is coupled to backsplash 56. Control panel 58 and input selectors 60 collectively form a user interface input for operator selection of machine cycles and features, and in one embodiment a display 61 indicates selected features, a countdown timer, and other items of interest to machine users. A lid 62 is mounted to cover 54 and is rotatable about a hinge (not shown) between an open position (not shown) facilitating access to a wash tub 64 located within cabinet 52, and a closed position (shown in FIG. 1) forming a sealed enclosure over wash tub 64.

As illustrated in FIG. 1, washing machine appliance 50 is a vertical axis washing machine appliance. While the present disclosure is discussed with reference to a vertical axis washing machine appliance, those of ordinary skill in the art, using the disclosures provided herein, should understand that the subject matter of the present disclosure is equally applicable to other washing machine appliances, such as horizontal axis washing machine appliances.

Tub 64 includes a bottom wall 66 and a sidewall 68, and a basket 70 is rotatably mounted within wash tub 64. A pump assembly 72 is located beneath tub 64 and basket 70 for gravity assisted flow when draining tub 64. Pump assembly 72 includes a pump 74 and a motor 76. A pump inlet hose 80 extends from a wash tub outlet 82 in tub bottom wall 66 to a pump inlet 84, and a pump outlet hose 86 extends from a pump outlet 88 to an appliance washing machine water outlet 90 and ultimately to a building plumbing system discharge line (not shown) in flow communication with outlet 90.

FIG. 2 provides a front elevation schematic view of certain components washing machine appliance 50 including wash basket 70 movably disposed and rotatably mounted in wash tub 64 in a spaced apart relationship from tub side wall 68 and tub bottom 66. Basket 70 includes a plurality of perforations therein to facilitate fluid communication between an interior of basket 70 and wash tub 64.

A hot liquid valve 102 and a cold liquid valve 104 deliver fluid, such as water, to basket 70 and wash tub 64 through a respective hot liquid hose 106 and a cold liquid hose 108. Liquid valves 102, 104 and liquid hoses 106, 108 together form a liquid supply connection for washing machine appliance 50 and, when connected to a building plumbing system (not shown), provide a fresh water supply for use in washing machine appliance 50. Liquid valves 102, 104 and liquid hoses 106, 108 are connected to a basket inlet tube 110, and fluid is dispersed from inlet tube 110 through a nozzle assembly 112 having a number of openings therein to direct washing liquid into basket 70 at a given trajectory and velocity. A dispenser (not shown in FIG. 2), may also be provided to produce a wash solution by mixing fresh water with a known detergent or other composition for cleansing of articles in basket 70.

An agitation element 116, such as a vane agitator, impeller, auger, or oscillatory basket mechanism, or some combination thereof is disposed in basket 70 to impart an oscillatory motion to articles and liquid in basket 70. In various exemplary embodiments, agitation element 116 may be a single action element (oscillatory only), double action (oscillatory movement at one end, single direction rotation at the other end) or triple action (oscillatory movement plus single direction rotation at one end, single direction rotation at the other end). As illustrated in FIG. 2, agitation element 116 is oriented to rotate about a vertical axis 118.

Basket 70 and agitator 116 are driven by a motor 120 through a transmission and clutch system 122. The motor 120 drives shaft 126 to rotate basket 70 within wash tub 64. Clutch system 122 facilitates driving engagement of basket 70 and agitation element 116 for rotatable movement within wash tub 64, and clutch system 122 facilitates relative rotation of basket 70 and agitation element 116 for selected portions of wash cycles. Motor 120 and transmission and clutch system 122 collectively are referred herein as a motor assembly 148.

Basket 70, tub 64, and machine drive system 148 are supported by a vibration dampening suspension system. The dampening suspension system can include one or more damping assemblies 92, such as piston-cylinder damping assemblies as discussed herein, coupled between and to the wash tub 64 and the basket 70. The dampening suspension system can include other elements, such as a balance ring 94 disposed around the upper circumferential surface of the wash basket 70. The balance ring 94 can be used to counterbalance an out of balance condition for the wash machine as the basket 70 rotates within the wash tub 64. The wash basket 70 could also include a balance ring 96 located at a lower circumferential surface of the wash basket 70.

A dampening suspension system generally operates to dampen dynamic motion as the wash basket 70 rotates within the wash basket 64. The dampening suspension system has various natural operating frequencies of the dynamic system. These natural operating frequencies are referred to as the modes of suspension for the washing machine. For instance, the first mode of suspension for the washing machine occurs when the dynamic system including the wash basket 70, tub 64, and dampening suspension system are operating at the first resonant or natural frequency of the dynamic system.

Operation of washing machine appliance 50 is controlled by a controller 150 which is operatively coupled to the user interface input located on washing machine backsplash 56 (shown in FIG. 1) for user manipulation to select washing machine cycles and features. In response to user manipulation of the user interface input, controller 150 operates the various components of washing machine appliance 50 to execute selected machine cycles and features.

In an illustrative embodiment, laundry items are loaded into basket 70, and washing operation is initiated through operator manipulation of control input selectors 60 (shown in FIG. 1). Tub 64 is filled with water and mixed with detergent to form a wash fluid, and basket 70 is agitated with agitation element 116 for cleansing of laundry items in basket 70. That is, agitation element is moved back and forth in an oscillatory back and forth motion. In the illustrated embodiment, agitation element 116 is rotated clockwise a specified amount about the vertical axis of the machine, and then rotated counterclockwise by a specified amount. The clockwise/counterclockwise reciprocating motion is sometimes referred to as a stroke, and the agitation phase of the wash cycle constitutes a number of strokes in sequence. Acceleration and deceleration of agitation element 116 during the strokes imparts mechanical energy to articles in basket 70 for cleansing action. The strokes may be obtained in different embodiments with a reversing motor, a reversible clutch, or other known reciprocating mechanism. After the agitation phase of the wash cycle is completed, tub 64 is drained with pump assembly 72. Laundry items are then rinsed and portions of the cycle may be repeated, including the agitation phase, depending on the particulars of the wash cycle selected by a user.

Referring now to FIGS. 3 through 7, damping assemblies 92 for use in washing machine appliances 50 are provided. Such damping assemblies are advantageously passive damping assemblies which provide variable damping during operation. Accordingly, improved damping of the washing machine appliance 50 generally in a variety of modes of suspension, etc., is facilitated through use of such damping assemblies. Further, such damping assemblies are relatively inexpensive due to their passive nature, thus allowing for use in both high and low end washing machine appliances 50.

As illustrated, a damping assembly 92 may include a cylinder 200. The cylinder 200 defines a central longitudinal axis 202, and includes a sidewall 204 that defines an interior 206. The interior 206 includes a central bore 208 and one or more pockets that concentrically surround the central bore 208. The central bore 208 and the one or more pockets are further defined by the sidewall 204, as shown.

For example, a first pocket 210 may concentrically surround the central bore 208. The sidewall 204 may include an upper shoulder 212 and a lower shoulder 214 (the term upper shoulder may be defined as the shoulder closer to the portion of the piston, discussed herein, that is external to the cylinder relative to the other associated shoulder, while the term lower shoulder may be defined as the shoulder further from the portion of the piston that is external to the cylinder relative to the other associated shoulder). Each shoulder 212, 214 may connect the pocket 210 and the bore 208. The shoulders 212, 214 may, for example, be transverse portions of the sidewall 204.

Central bore 208 may have a length 209, and first pocket 210 may have a length 211. The lengths 209, 211 may be defined along the central longitudinal axis. As shown, the length 211 of the first pocket 210 may be less than the length 209 of the central bore 208. Further, in some embodiments as shown, the first pocket 210 may be generally centered along the length 209 of the central bore 208.

Further, in some embodiments, a second pocket 220 may concentrically surround the first pocket 210 and the central bore 208. The sidewall 204 may thus further include an upper shoulder 222 and a lower shoulder 224. Each shoulder 222, 224 may connect the second pocket 220 and the first pocket 210. The shoulders 222, 224 may, for example, be transverse portions of the sidewall 204.

Second pocket 220 may have a length 221. The length 221 may be defined along the central longitudinal axis 202. As shown, the length 221 of the second pocket 220 may be less than the length 211 of the first pocket 210. Further, in some embodiments as shown, the second pocket 220 may be generally centered along the length 211 of the first pocket 210.

Still further, in some embodiments, a third pocket 230 may concentrically surround the second pocket 220, first pocket 210 and the central bore 208. The sidewall 204 may thus further include an upper shoulder 232 and a lower shoulder 234. Each shoulder 232, 234 may connect the third pocket 230 and the second pocket 220. The shoulders 232, 234 may, for example, be transverse portions of the sidewall 204.

Third pocket 230 may have a length 231. The length 231 may be defined along the central longitudinal axis 202. As shown, the length 231 of the third pocket 230 may be less than the length 221 of the second pocket 220. Further, in some embodiments as shown, the third pocket 230 may be generally centered along the length 221 of the second pocket 220.

Additionally, it should be noted that a maximum width or diameter of the first pocket 210 may be greater than a maximum width or diameter of the central bore 208, a maximum width or diameter of the second pocket 220 may be greater than a maximum width or diameter of the first pocket 210, and a maximum width or diameter of the third pocket 230 may be greater than a maximum width or diameter of the second pocket 220.

It should be understood that the present disclosure is not limited to three pockets. Damping assemblies 92 with only one or two pockets may be utilized, and damping assemblies 92 with more than three pockets are further within the scope and spirit of the present disclosure.

Damping assembly 92 may further include a piston 240. The piston 240 may extend between a first end 242 and a second end 244, and may have a length 246 defined between the first end 242 and second end 244. The piston 240 may be partially disposed in the central bore 208, such that for example the first end 242 is disposed in the interior 206 and the second end 244 is external to the cylinder 200. The piston 240 may further be movable along the longitudinal axis 202 relative to the cylinder 200.

Still further, damping assembly 92 may include one or more tube assemblies that concentrically surround the piston 240. The tube assemblies may each provide frictional force and resulting damping for the damping assembly 92. Further, due to differential sizing of the tube assemblies relative to the piston 240 and each other, variable damping may be provided by the damping assembly 92.

For example, a first tube assembly 250 may concentrically surround the piston 240. The first tube assembly 250 may be movable along the longitudinal axis 202, and the piston 240 may be movable along the longitudinal axis 202 relative to the first tube assembly 250, as discussed herein. The first tube assembly 250 may be at least partially disposed in the first pocket 210, such that the first tube assembly 250 may contact the respective shoulders 212, 214 when the first tube assembly 250 has moved along the longitudinal axis 202 to the respective ends of the pocket 210. The first tube assembly 250 may further have a length 252, which may be less than the length 211 of the first pocket 210 such that the first tube assembly 250 can move along the longitudinal axis 202 within the pocket 210.

In some embodiments, the length 252 of the first tube assembly 250 may be greater than the length 221 of the second pocket 220. The length 252 of the first tube assembly 250 may further be less than the length 246 of the piston 240.

Further, a second tube assembly 260 may concentrically surround the first tube assembly 250 and piston 240. The second tube assembly 260 may be movable along the longitudinal axis 202, and the first tube assembly 250 may be movable along the longitudinal axis 202 relative to the second tube assembly 260, as discussed herein. The second tube assembly 260 may be at least partially disposed in the second pocket 220, such that the second tube assembly 260 may contact the respective shoulders 222, 224 when the second tube assembly 260 has moved along the longitudinal axis 202 to the respective ends of the pocket 220. The second tube assembly 260 may further have a length 262, which may be less than the length 221 of the second pocket 220 such that the second tube assembly 260 can move along the longitudinal axis 202 within the pocket 220.

In some embodiments, a difference between the length 211 of the first pocket 210 and the length 252 of the first tube assembly 250 may be greater than a difference between the length 221 of the second pocket 220 and the length 262 of the second tube assembly 260. Further, in some embodiments, the length of the second tube assembly 260 may be greater than the length 231 of the second pocket 230. The length 262 of the second tube assembly 260 may further be less than the length 252 of the first tube assembly 250.

Still further, a third tube assembly 270 may concentrically surround the second tube assembly 250, first tube assembly 250 and piston 240. The third tube assembly 270 may be movable along the longitudinal axis 202, and the second tube assembly 260 may be movable along the longitudinal axis 202 relative to the third tube assembly 270, as discussed herein. The third tube assembly 270 may be at least partially disposed in the third pocket 230, such that the third tube assembly 270 may contact the respective shoulders 232, 234 when the third tube assembly 270 has moved along the longitudinal axis 202 to the respective ends of the pocket 220. The third tube assembly 270 may further have a length 272, which may be less than the length 231 of the second pocket 230 such that the third tube assembly 270 can move along the longitudinal axis 202 within the pocket 230.

In some embodiments, a difference between the length 221 of the second pocket 220 and the length 262 of the second tube assembly 260 may be greater than a difference between the length 231 of the third pocket 230 and the length 272 of the third tube assembly 270. The length 272 of the third tube assembly 270 may further be less than the length 262 of the second tube assembly 260.

It should be understood that the present disclosure is not limited to three tube assemblies. Damping assemblies 92 with only one or two tube assemblies may be utilized, and damping assemblies 92 with more than three tube assemblies are further within the scope and spirit of the present disclosure. Typically, the total number of tube assemblies is equal to the total number of pockets.

In some embodiments, the tube assemblies may each be formed from a single material and may thus be single components. In other embodiments, multiple components may be included in each tube assembly. For example, a tube assembly may include a rigid layer and a flexible layer. The first tube assembly 250 is illustrated for example as having a rigid layer 254 and a flexible layer 256, while the second tube assembly 260 is illustrated for example as having a rigid layer 264 and a flexible layer 266 and the third tube assembly 270 is illustrated for example as having a rigid layer 274 and a flexible layer 276. A rigid layer 254, 264, 275 may, for example, be a metal cylinder as shown. A flexible layer 256, 266, 276 may, for example, be formed from an elastomeric tube. In particular, compressible elastomers, such as foams, are desirable. Alternatively, rubbers, including unsaturated and saturated rubbers, along with other non-compressible elastomers may be utilized. The elastomeric tube may be adhered or otherwise fastened to the metal cylinder. Alternatively, a rigid layer and flexible layer may each be formed from any suitable material. In some embodiments, a flexible layer may for example include one or more o-rings, which may for example be mounted in grooves defined in the rigid layer.

In exemplary embodiments as shown, the flexible layer of a tube assembly may be disposed within the rigid layer. Alternatively, however, the rigid layer may be disposed within the flexible layer.

In some embodiments, as shown, the thickness of the tube assemblies, such as of the layers thereof, may be constant throughout the lengths of the tube assemblies. In other embodiments, however, the thickness of the tube assemblies may change. For example, the thickness of one or more tube assemblies may taper throughout the length or a portion thereof in either direction along the central longitudinal axis 202. For example, in some exemplary embodiments wherein a rigid layer and a flexible layer are utilized to form a tube assembly, the rigid layer, the flexible layer, or both may taper in thickness throughout the length or a portion thereof in either direction along the central longitudinal axis 202.

Interaction between the tube assemblies themselves and between the tube assemblies and the piston advantageously provide variable damping. For example, FIGS. 3 through 7 illustrate the variable damping that occurs during a movement of the piston 240 within the cylinder 200 in one direction along the central longitudinal axis 202. In exemplary embodiments, such variable damping may occur in both directions of movement along the central longitudinal axis 202 as shown.

FIG. 4 illustrates initial movement. During this movement, the piston 240 and the first, second and third tube assemblies 250, 260, 270 all move together in a direction along the central longitudinal axis 202. A minimal frictional force is provided by the outside surface of the third tube assembly 270 (in this case the rigid layer 274) against the sidewall 204 in the third pocket 230.

Once the third tube assembly 270 contacts a sidewall of the third pocket 230, however, such as sidewall 234 (or 232), the third tube assembly 270 can no longer move in that direction along the central longitudinal axis 202. When such contact occurs, movement of the third tube assembly 270 stops, but the piston 240 and the first and second tube assemblies 250, 260 all continue to move together in a direction along the central longitudinal axis 202, as shown in FIG. 5. An increased frictional force, such as a low intermediate frictional force, is provided by the inside surface of the third tube assembly 270 (in this case the flexible layer 276) against the second tube assembly 270. Such increase in frictional force may, for example, be due to the pliant and compressible nature of the flexible layer 276.

Once the second tube assembly 260 contacts a sidewall of the second pocket 220, however, such as sidewall 224 (or 222), the second tube assembly 260 can no longer move in that direction along the central longitudinal axis 202. When such contact occurs, movement of the second tube assembly 260 stops, but the piston 240 and the first assembly 250 all continue to move together in a direction along the central longitudinal axis 202, as shown in FIG. 6. An increased frictional force, such as a high intermediate frictional force, is provided by the inside surface of the second tube assembly 260 (in this case the flexible layer 266) against the first tube assembly 250. Such increase in frictional force may, for example, be due to the length of the second tube assembly 260 and resulting increased friction-providing surface area relative to the length of the third tube assembly 270.

Once the first tube assembly 250 contacts a sidewall of the first pocket 210, however, such as sidewall 214 (or 212), the first tube assembly 250 can no longer move in that direction along the central longitudinal axis 202. When such contact occurs, movement of the first tube assembly 250 stops, but the piston 240 continues to move in a direction along the central longitudinal axis 202, as shown in FIG. 7. An increased frictional force, such as a maximum frictional force, is provided by the inside surface of the first tube assembly 250 (in this case the flexible layer 256) against the piston 240. Such increase in frictional force may, for example, be due to the length of the first tube assembly 250 and resulting increased friction-providing surface area relative to the length of the second tube assembly 260.

Accordingly, the present disclosure provides improved damping assemblies 92 which facilitate variable damping during operation. Such damping assemblies 92 may be connected within washing machine appliances 50. For example, it should be noted that a damping assembly 92 may additionally include one or more coupling features for coupling the damping assembly 92 to, for example, the basket 70 and tub 64. For example a coupling feature 300 may be provided on an exterior end of the cylinder 200, such as the end distal from the exterior portion of the piston 240, and a coupling feature 302 may be provided on the second end 244 of the piston 240. One of the coupling features 300, 302 may be connected to the basket 70, and the other may be connected to the tub 64. A coupling feature may, for example, be a protrusion defining an aperture through which a mating fastener may be provided to connect the coupling feature. Alternatively, any suitable coupling features are within the scope and spirit of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A damper assembly, comprising:
a cylinder defining a central longitudinal axis, the cylinder comprising a sidewall that defines an interior, the sidewall defining a central bore and a first pocket concentrically surrounding the central bore, the sidewall comprising an upper shoulder and a lower shoulder that each connect the first pocket and the central bore, the sidewall further defining a second pocket concentrically surrounding the first pocket and further comprising an upper shoulder and a lower shoulder that each connect the second pocket and the first pocket, the second pocket having length that is less than the length of the first pocket;
a piston partially disposed in the central bore and movable along the longitudinal axis relative to the cylinder;
a first tube assembly concentrically surrounding the piston and at least partially disposed in the first pocket, the first tube assembly having a length that is less than a length of the first pocket; and
a second tube assembly concentrically surrounding the first tuba assembly and at least partially disposed in the second pocket, the second tube assembly having a length that is less than a length of the second pocket,
wherein the piston is further movable along the longitudinal axis relative to the first tube assembly.

2. The damper assembly of claim 1, wherein the tube assembly comprises a rigid layer and a flexible layer.

3. The damper assembly of claim 2, wherein the rigid layer is a metal cylinder and the flexible layer is an elastomeric tube.

4. The damper assembly of claim 2, wherein the flexible layer is disposed within the rigid layer.

5. The damper assembly of claim 1, wherein the length of the first tube assembly is greater than the length of the second pocket.

6. The damper assembly of claim 1, wherein a difference between the length of the first pocket and the length of the first tube assembly is greater than a difference between the length of the second pocket and the length of the second tube assembly.

7. The damper assembly of claim 1, wherein the sidewall further defines a third pocket concentrically surrounding the second pocket and further comprises an upper shoulder and a lower shoulder that each connect the third pocket and the second pocket, the third pocket having a length that is less than the length of the second pocket, and further comprising a third tube assembly concentrically surrounding the second tube assembly and at least partially disposed in the third pocket, the third tube assembly having a length that is less than a length of the third pocket.

8. The damper assembly of claim 7, wherein the length of the second tube assembly is greater than the length of the third pocket.

9. The damper assembly of claim 7, wherein a difference between the length of the second pocket and the length of the second tube assembly is greater than a difference between the length of the third pocket and the length of the third tube assembly.

10. A washing machine appliance, comprising:
a cabinet;
a tub disposed within the cabinet; and
a damper assembly, the damper assembly comprising:
a cylinder defining a central longitudinal axis, the cylinder comprising a sidewall that defines an interior, the sidewall defining a central bore and a first pocket concentrically surrounding the central bore, the sidewall comprising an upper shoulder and a lower shoulder that each connect the first pocket and the central bore, the sidewall further defining a second pocket concentrically surrounding the first pocket and further comprising an upper shoulder and a lower shoulder that each connect the second pocket and the first pocket, the second pocket having a length that is less than the length of the first pocket;
a piston partially disposed in the central bore and movable along the longitudinal axis relative to the cylinder;
a first tube assembly concentrically surrounding the piston and at least partially disposed in the first pocket, the first tube assembly having a length that is less than a length of the first pocket; and
a second tube assembly concentrically surrounding the first tube assembly and at least partially disposed in the second pocket, the second tube assembly having a length that is less than a length of the second pocket,
wherein the piston is further movable along the longitudinal axis relative to the first tube assembly.

11. The washing machine appliance of claim 10, wherein the tube assembly comprises a rigid layer and a flexible layer.

12. The washing machine appliance of claim 11, wherein the rigid layer is a metal cylinder and the flexible layer is an elastomeric tube.

13. The washing machine appliance of claim 11, wherein the flexible layer is disposed within the rigid layer.

14. The washing machine appliance of claim 10, wherein the length of the first tube assembly is greater than the length of the second pocket.

15. The washing machine appliance of claim 10, wherein a difference between the length of the first pocket and the length of the first tube is greater than a difference between the length of the second pocket and the length of the second tube.

16. The washing machine appliance of claim 10, wherein the sidewall further defines a third pocket concentrically surrounding the second pocket and further comprises an upper shoulder and a lower shoulder that each connect the third pocket and the second pocket, the third pocket having a length that is less than the length of the second pocket, and further comprising a third tube assembly concentrically surrounding the second tube assembly and at least partially disposed in the third pocket, the third tube assembly having a length that is less than a length of the third pocket.

17. The washing machine appliance of claim 16, wherein the length of the second tube assembly is greater than the length of the third pocket.

18. The washing machine appliance of claim 16, wherein a difference between the length of the second pocket and the length of the second tube is greater than a difference between the length of the third pocket and the length of the third tube.

* * * * *